United States Patent
Miura

(10) Patent No.: US 9,277,120 B2
(45) Date of Patent: Mar. 1, 2016

(54) IMAGE CAPTURING APPARATUS PROVIDED WITH A PEAKING FUNCTION, CONTROL METHOD THEREFOR, AND STORAGE MEDIUM

(71) Applicant: CANON KABUSHIKI KAISHA, Tokyo (JP)

(72) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/795,723

(22) Filed: Mar. 12, 2013

(65) Prior Publication Data
US 2013/0250145 A1    Sep. 26, 2013

(30) Foreign Application Priority Data
Mar. 26, 2012    (JP) .................................. 2012-069992

(51) Int. Cl.
*H04N 5/232* (2006.01)
*H04N 5/262* (2006.01)

(52) U.S. Cl.
CPC ....... *H04N 5/23235* (2013.01); *H04N 5/23212* (2013.01); *H04N 5/23293* (2013.01); *H04N 5/262* (2013.01)

(58) Field of Classification Search
CPC .... H04N 5/272; H04N 2101/00; H04N 5/772
USPC ............................... 348/222.1, 239, 241, 253
See application file for complete search history.

(56) References Cited

U.S. PATENT DOCUMENTS

| | | | |
|---|---|---|---|
| 2006/0033831 A1* | 2/2006 | Ejima et al. | 348/333.01 |
| 2008/0055435 A1* | 3/2008 | Kawamura et al. | 348/253 |
| 2008/0158382 A1 | 7/2008 | Katoh | |
| 2009/0237523 A1* | 9/2009 | Date et al. | 348/222.1 |
| 2010/0253702 A1* | 10/2010 | Gotoh | 345/660 |
| 2010/0259652 A1 | 10/2010 | Miura | |

FOREIGN PATENT DOCUMENTS

| | | |
|---|---|---|
| JP | 4245019 B2 | 3/2009 |
| JP | 4474641 B2 | 6/2010 |

\* cited by examiner

*Primary Examiner* — Gevell Selby
(74) *Attorney, Agent, or Firm* — Canon USA, Inc. I.P. Division

(57) ABSTRACT

An image capturing apparatus realizes a precise focus assist function without losing edge information of a multi-pixel video image. The image capturing apparatus includes an image sensor arranged in a Bayer array, a circuit for converting resolution of the video signal obtained by the image sensor, a circuit for extracting high frequency components of each color pixel data of the video signal, a selection circuit for selecting the high frequency components of four pixels in a unit of the Bayer array and for outputting the component of the greatest amplitude as peaking information, and a superimposition circuit for superimposing the peaking information on the video signal of the resolution or substituting the video signal with the peaking information.

18 Claims, 7 Drawing Sheets

DEBAYER(DEVELOPMENT)/
COLOR SPACE CONVERSION/RESIZE

COMPARE LEVELS OF R11', Gr11', Gb11', AND B11' FOR SELECTION

SUPERIMPOSING

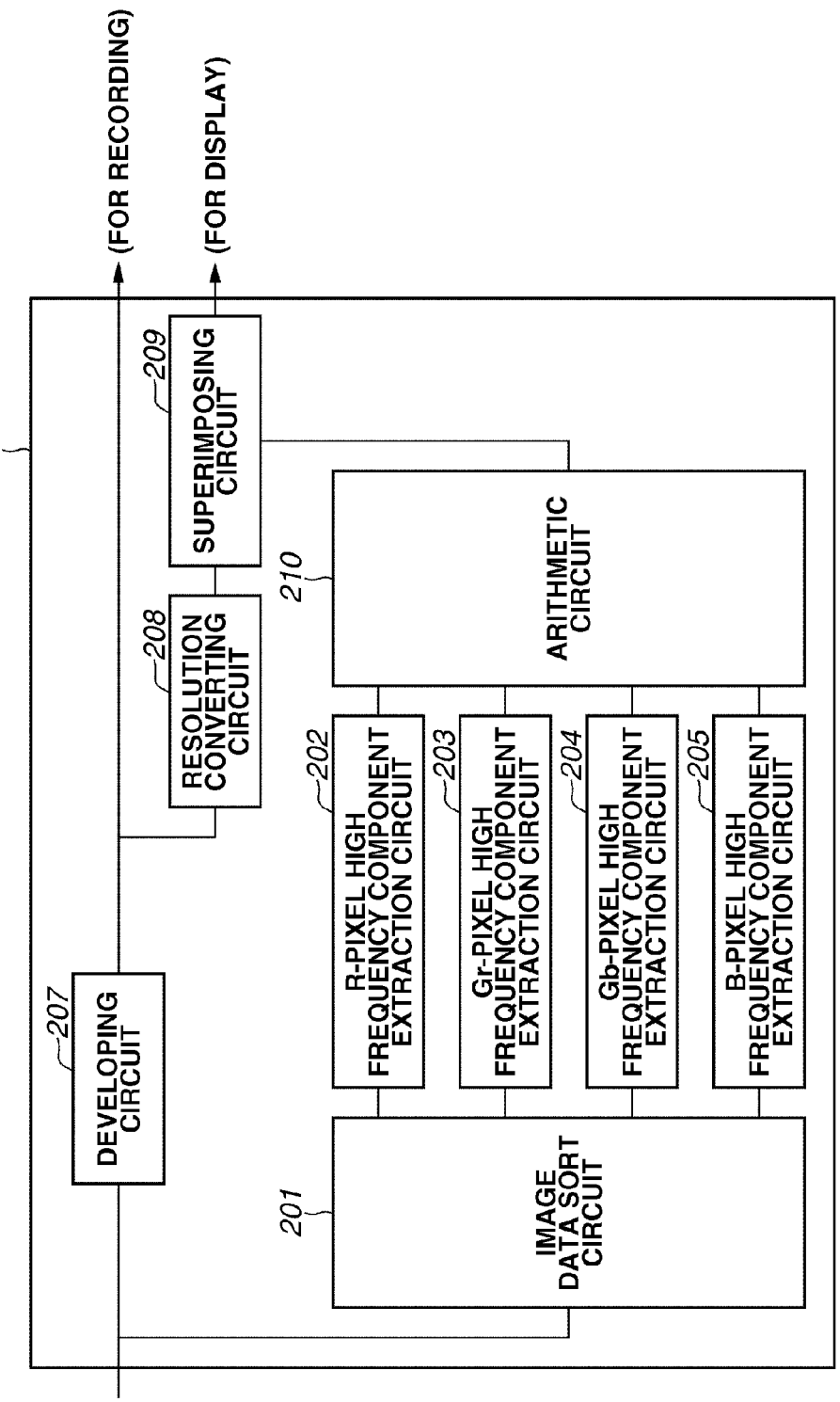

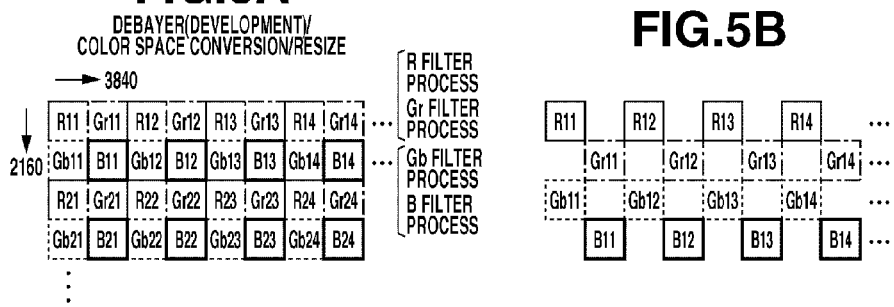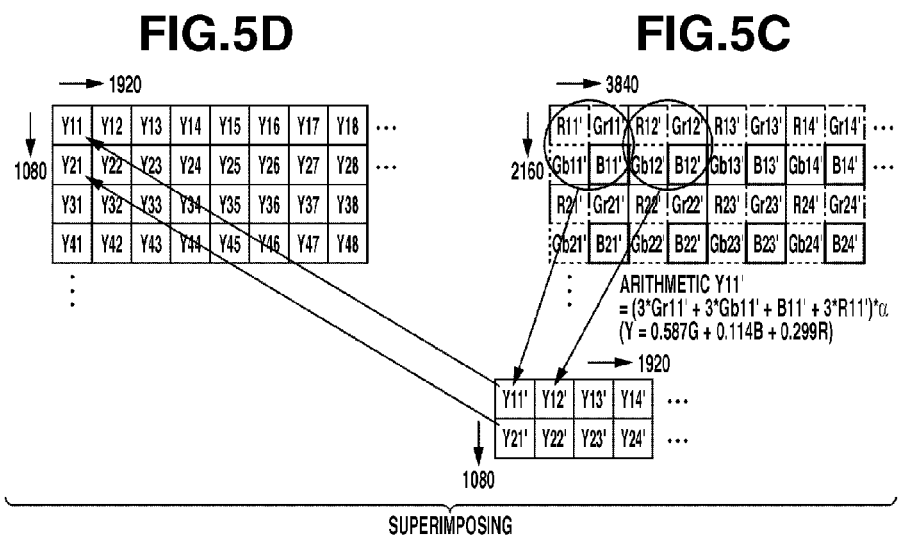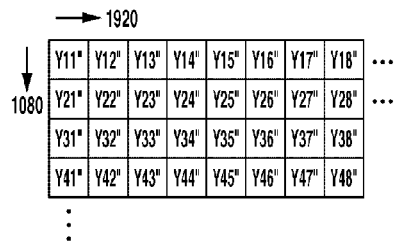

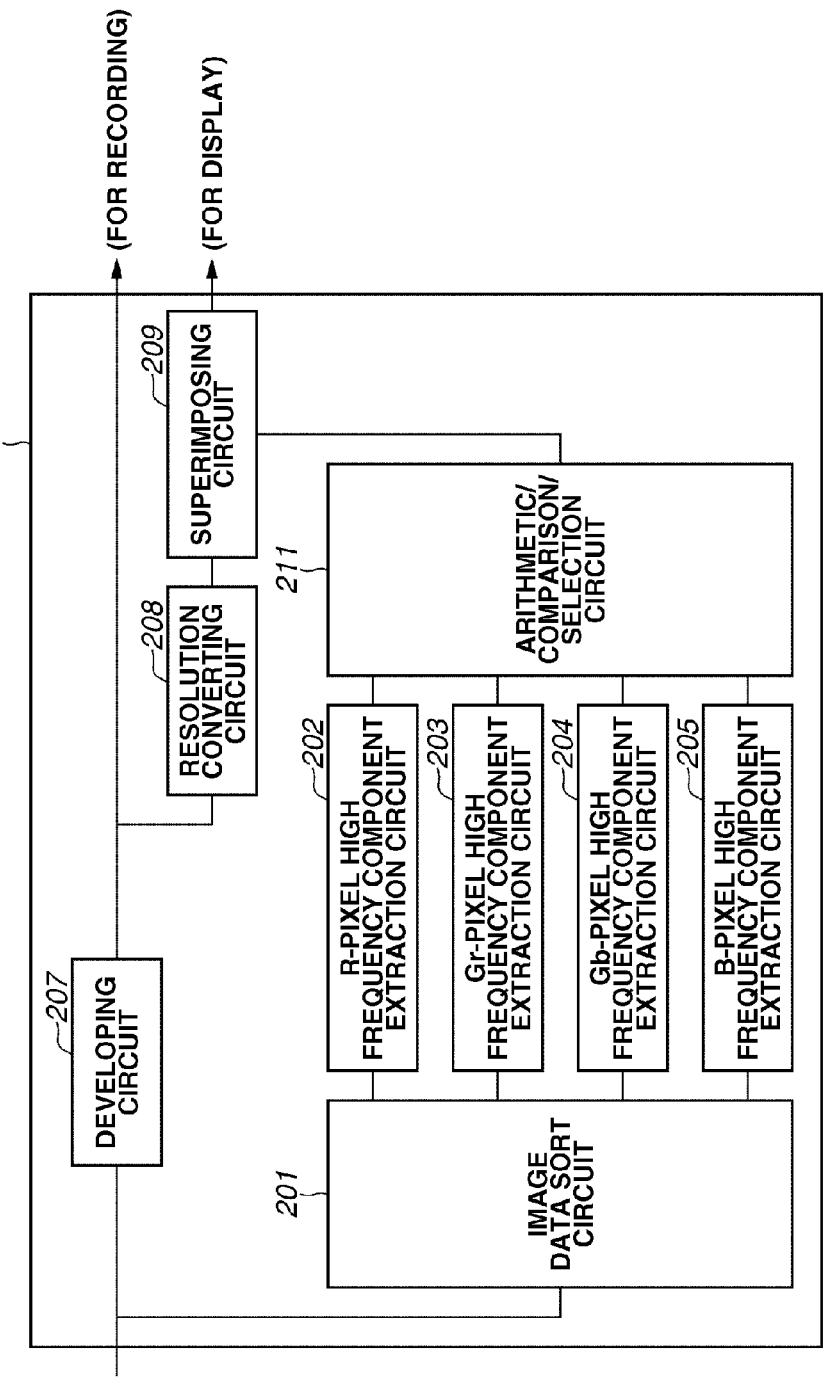

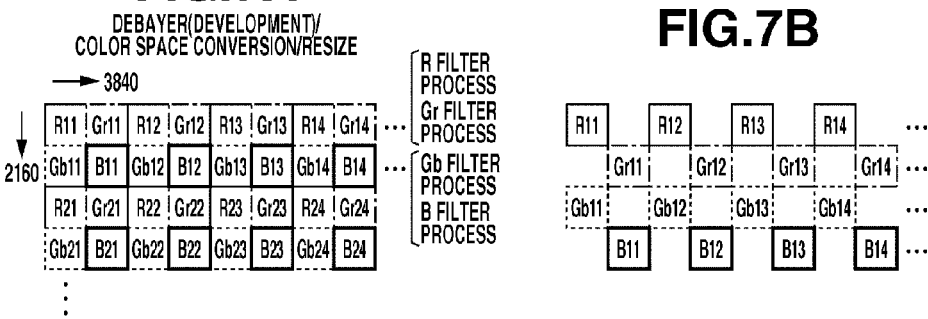
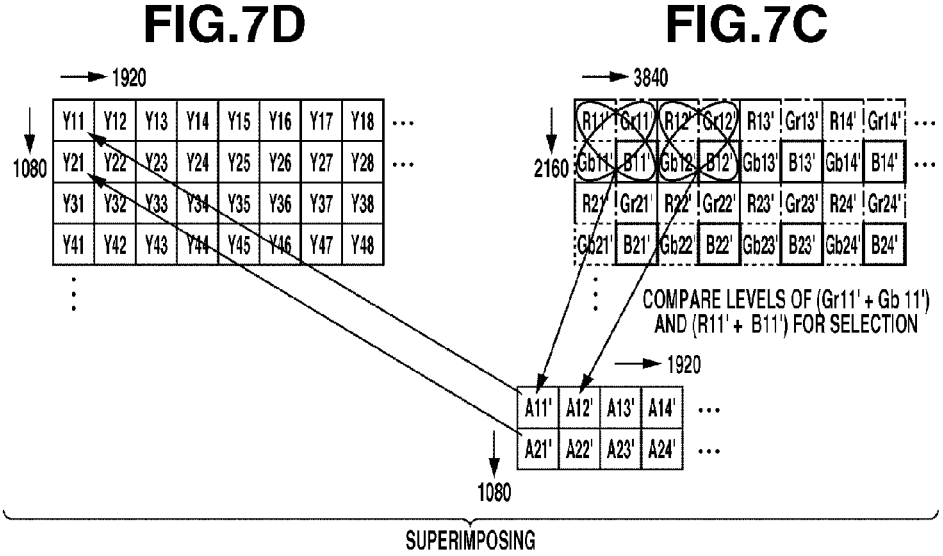
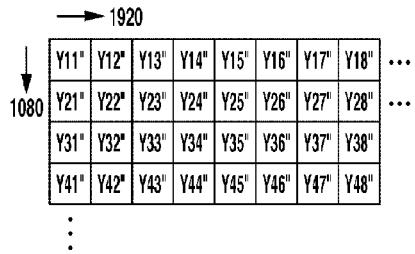

IMAGE CAPTURING APPARATUS PROVIDED WITH A PEAKING FUNCTION, CONTROL METHOD THEREFOR, AND STORAGE MEDIUM

BACKGROUND OF THE INVENTION

1. Field of the Invention

The present invention relates to an image capturing apparatus provided with a peaking function, a control method for the image capturing apparatus, and a storage medium.

2. Description of the Related Art

Conventionally, focus adjustment of a shooting subject for a movie film is carried out in a digital cine-camera mostly by a camera operator performing a manual focus (MF) operation. There is a business-use digital video camera for a TV station etc. as well as a household digital video camera that can perform not only auto focus (AF) operation but can switch from AF to an MF operation.

In order to facilitate the focus adjustment, at the time of adjusting focus, a function can be utilized that emphasizes a high-frequency component and generates a clear contour of an image to display the captured image in a view finder. This function is referred to as "peaking, contour correction, edge emphasis, enhancer etc." By this technique, the contour information is extracted from the captured image. The contour information is added to an original image to emphasize the contour.

For example, Japanese Patent No. 4,474,641 discloses a "focus adjustment signal generating apparatus". In this apparatus, a luminance signal is converted into an RGB signal, each of which is filtered out through a low pass filter (LPF) or a high pass filter (HPF) in a vertical or horizontal direction. Then, addition is performed on absolute values of either LPF or HPF filtering results to generate the RGB signal for the focus adjustment.

Further, Japanese Patent No. 4,245,019 discloses a "view finder, image capturing apparatus and display signal generating circuit". In this circuit, a high-frequency component is detected from each of three primary colors of a video signal to extract the peaking signal. Then, weighting addition is performed on the peaking signal, which is added to the three primary colors of the video signal.

On the other hand, a size of an image sensor becomes larger and shooting may be carried out with a fast lens so that movie shooting is carried out with a shallow depth of field. Coupled with high resolution of a captured image, it has become difficult to adjust focus in the MF operation.

When the peaking function for focus assistance is to be employed, while an image sensor becomes more and more multiplied and their size grows, miniaturization and streamlining of an imaging apparatus are also required. In such a circumstance, a display device with a high resolution and a large screen such as a viewfinder capable of displaying a shooting resolution as it is, cannot be always employed, and visibility for confirming the focus is not sufficiently achieved.

SUMMARY OF THE INVENTION

The present invention is directed to realizing a focus assist function for precisely adjusting the focus without losing edge information of a multi-pixel video image.

According to an aspect of the present invention, an image capturing apparatus includes an image sensor for converting an optical image of a shooting subject formed via an optical system into a video signal, a resolution converting unit configured to convert resolution of the video signal obtained by the image sensor, an extraction unit to configured to extract high frequency components of each color pixel data of the video signal obtained by the image sensor, a peaking information generating unit configured to generate peaking information from the high frequency components extracted by the extraction unit based on a pixel array of the image sensor, and a superimposing or substituting unit configured to superimpose the peaking information generated by the generating unit on the video signal of the resolution converted by the resolution converting unit or substitute the video signal with the peaking information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a block diagram illustrating a configuration for the peaking processing according to a second exemplary embodiment.

FIGS. 5A-5E illustrate image diagrams in the peaking processing according to the first exemplary embodiment.

FIG. 6 is a block diagram illustrating a configuration for the peaking processing according to a third exemplary embodiment.

FIGS. 7A-7E illustrate image diagrams in the peaking processing according to the third exemplary embodiment.

DESCRIPTION OF THE EMBODIMENTS

Various exemplary embodiments, features, and aspects of the invention will be described in detail below with reference to the drawings.

A digital cine-camera provided with a peaking function will be described as an example of an image capturing apparatus. The peaking function highlights an edge part or the like within a video image to perform focus adjustment.

Figure 1:
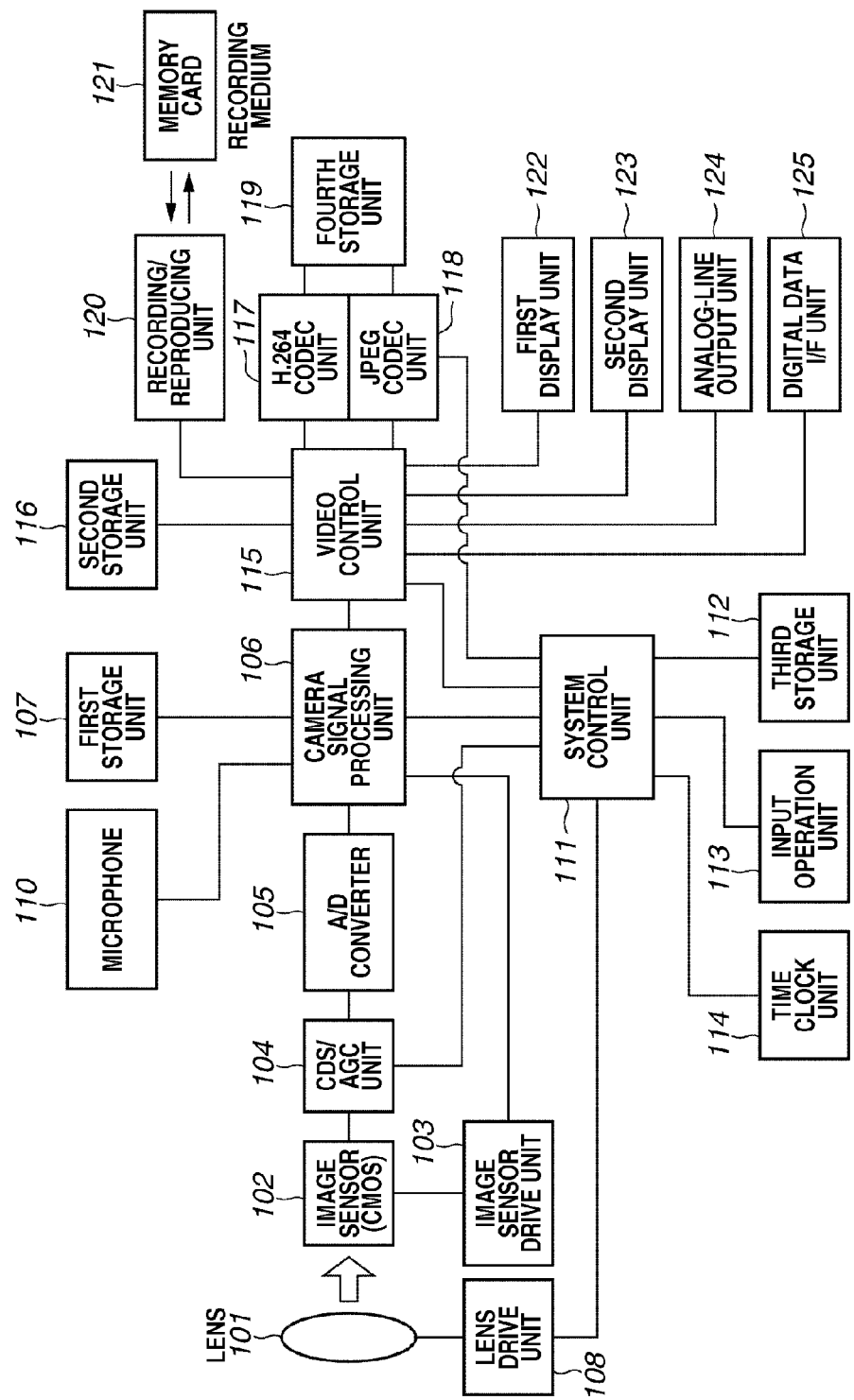
FIG. 1 is a block diagram illustrating a configuration example of a digital cine-camera according to a first exemplary embodiment.

In a block diagram of FIG. 1, a lens unit 101 constitutes an optical system, which forms a subject image on an image capture plane of an image sensor 102. The lens unit 101 is provided with a zooming function, a focus adjusting function and an aperture adjusting function which enable a user to perform a manual operation.

In the image sensor 102, a number of photo-electric conversion elements is two-dimensionally arrayed. The photo-electric conversion elements convert the optical subject image formed by the lens unit 101 into a video signal pixel by pixel. The image sensor 102 can be, for example, a complementary metal oxide semiconductor (CMOS) image sensor or a charged coupled device (CCD) image sensor. The image sensor 102 can also regulate charge accumulation time of the photo-electric conversion elements to perform an electronic shutter function.

An image sensor drive unit 103 drives the the image sensor 102 according to timing controlled by a camera signal processing unit 106. A CDS/AGC unit 104 subjects an analog video signal from the image sensor 102 to correlated double sampling (CDS) to reduce a noise, and under control of a system control unit 111, performs automatic gain control (AGC) of the signal level.

An analog-digital converter 105 (A/D converter) converts an analog video signal from the CDS/AGC unit 104 into a digital video signal to supply the converted signal to a camera signal processing unit 106. The camera signal processing unit 106 performs control of a camera imaging system such as timing signal generation, auto exposure (AE) control, gamma adjustment or auto focus (AF) control in collaboration with the system control unit 111.

Further, the camera signal processing unit 106 performs extraction of high frequency components and superimposition of peaking information as will be described below.

The digital cine-camera according to the present exemplary embodiment includes a first storage unit 107, a second storage unit 116, a third storage unit 112, and a fourth storage unit 119, which are provided for various types of applications. According to the present exemplary embodiment, for the sake of convenience, individually, the first storage unit 107 is provided to process a camera signal, the second storage unit 116 to control video, the third storage unit 112 to control the system, and the fourth storage unit 119 for codec, as an example. However, from a physical point of view, the same storage unit can realize the applications.

The first to the fourth storage units 107, 116, 112, and 119 are typically constituted by readable and writable semiconductor memories. However, at least one memory may include another type of a storage device.

The camera signal processing unit 106 uses the first storage unit 107 as a frame memory and the like which is used in processing a signal of a captured video image. The lens drive unit 108 can drive a motor, an actuator and the like in a lens unit (not illustrated) under control of the system control unit 111 to adjust zoom magnification, focusing or exposure without receiving a manual operation from the user.

The system control unit 111 controls the lens drive unit 108 according to a processing result of the video signal in the camera signal processing unit 106. For example, at the time of AF control, the system control unit 111 controls the lens drive unit 108 on the basis of an AF evaluation value obtained by the camera signal processing unit 106 to control an autofocus adjusting lens of the lens unit 101 so that the lens unit 101 focuses with the subject image.

A microphone 110 is useful in recording an ambient sound and the sound obtained by the microphone 110 is supplied to the camera signal processing unit 106. For example, when the sound obtained by the microphone 110 is recorded along with a video image captured by the image sensors 102, the camera signal processing unit 106 matches a temporal axe of the sound image with that of the video image and supplies them to a video control unit 115.

The system control unit 111 includes, for example, a central processing unit (CPU), which executes a program stored in the third storage unit to control an entire operation of the digital cine-camera. The third storage unit 112 includes, for example, a read only memory (ROM) or a random access memory (RAM) to store a program to be executed by the system control unit 111, settings of various types, or default values. Further, the third storage unit 112 also serves as a work area of the system control unit 111.

An input operation unit 113 is a user interface, via which a photographer issues instructions to the digital cine-camera. The input operation unit 113 is provided with input devices such as keys and various operation buttons. A time measuring unit 114 is provided with a real time clock (RTC) and a back-up battery, which returns time and date in response to a request from the system control unit 111.

The video control unit 115 performs display control including control of hue, saturation and luminance on a first display unit 122 and a second display unit 123, output control of an analog line output unit 124, output control of a digital data I/F unit 125, control of a recording/reproducing unit 120, and the like. The video control unit 115 also performs resolution conversion of the video signal for each video image output system including the first display unit 122 and the second display unit 123, superimposition of a zebra pattern and the like.

Further, the video control unit 115 also performs on-screen display (OSD) such as display of photographic information, user setting menu, and a functional button required for a touch panel operation. The second storage unit 116 is a storage unit for video control and serves as a frame memory, a work memory and the like when the video control unit 115 performs signal processing for a video base band signal.

An H.264 codec unit 117 is one example of a moving image codec unit that performs encode/decode processing of a moving image. A format of encoding/decoding may be a moving picture experts group (MPEG)-2 method, however, the format can be any other method. Similarly, joint photographic experts group codec (JPEG) unit 118 is one example of still image codec that performs encode/decode processing of a still image. In a similar manner, a format of encoding/decoding may be JPEG 2000, or any other formats such as portable network graphics (PNG).

In the present exemplary embodiment, the JPEG codec unit 118 is connected to the video control unit 115 to share a circuit with the H.264 codec unit 117 and realize a function of capturing a still image from a reproduced moving image (capturing function). However, the JPEG codec unit 118 may also be directly connected to a camera signal processing unit 106. The fourth storage unit 119 is used for codec when the H.264 codec unit 117 and the JPEG codec unit 118 encode/decode a video image signal.

The video control unit 115 and H.264 codec unit 117, or the JPEG codec unit 118 perform encode processing on the record data, which is processed in a recording format. The recording/reproducing unit 120 records the processed record data in a recording medium 121, or reads out the recorded data. The recording medium 121 is not limited to a memory card but may be a digital versatile disc (DVD), a high capacity optical disc, a hard disc drive (HDD), a solid state drive (SSD) or the like which constitute a recording and reproducing system depending on the intended use.

The first display unit 122 and the second display unit 123 can display similar information. According to the present exemplary embodiment, the first display unit 122 is a relatively large-size display device that is openable and closable, and provided, for example, along a side of an apparatus casing. The second display unit 123 is a display device smaller than the first display unit 122 and is provided within a finder.

The first display unit 122 and the second display unit 123 display in a shooting mode auxiliary information such as a shooting aspect frame in addition to a video image input from the image sensor 102 or an enlarged image. The first display unit 122 and the second display unit 123 sequentially display the video image input from the image sensor 102, functioning as an electronic view finder.

On the other hand, the first display unit 122 and the second display unit 123 displays a moving image or a still image recorded in the recording medium 121. Further, the first display unit 122 and the second display unit 123 display operation information input by a photographer via an operation unit 113 or desired image information (shooting information) within the memory card of the recording medium 121.

An analog-line output unit 124 is a group of interfaces which are used for output of an analog-component video image, output of an S terminal and output of composite video image. The analog-line output unit 124 can be connected to, for example, an external monitor to display the video image output from the digital cine-camera according to the present exemplary embodiment A digital data I/F unit 125 can include one or more digital interfaces such as universal serial bus (USB), serial digital interface (SDI) and high-definition multimedia interface (HDMI).

Next, with reference to FIG. 2 and FIG. 3, peaking processing will be described, which serves as a focus assist function in a manual focus operation in a digital cine-camera according to the present exemplary embodiment.

Figure 2:
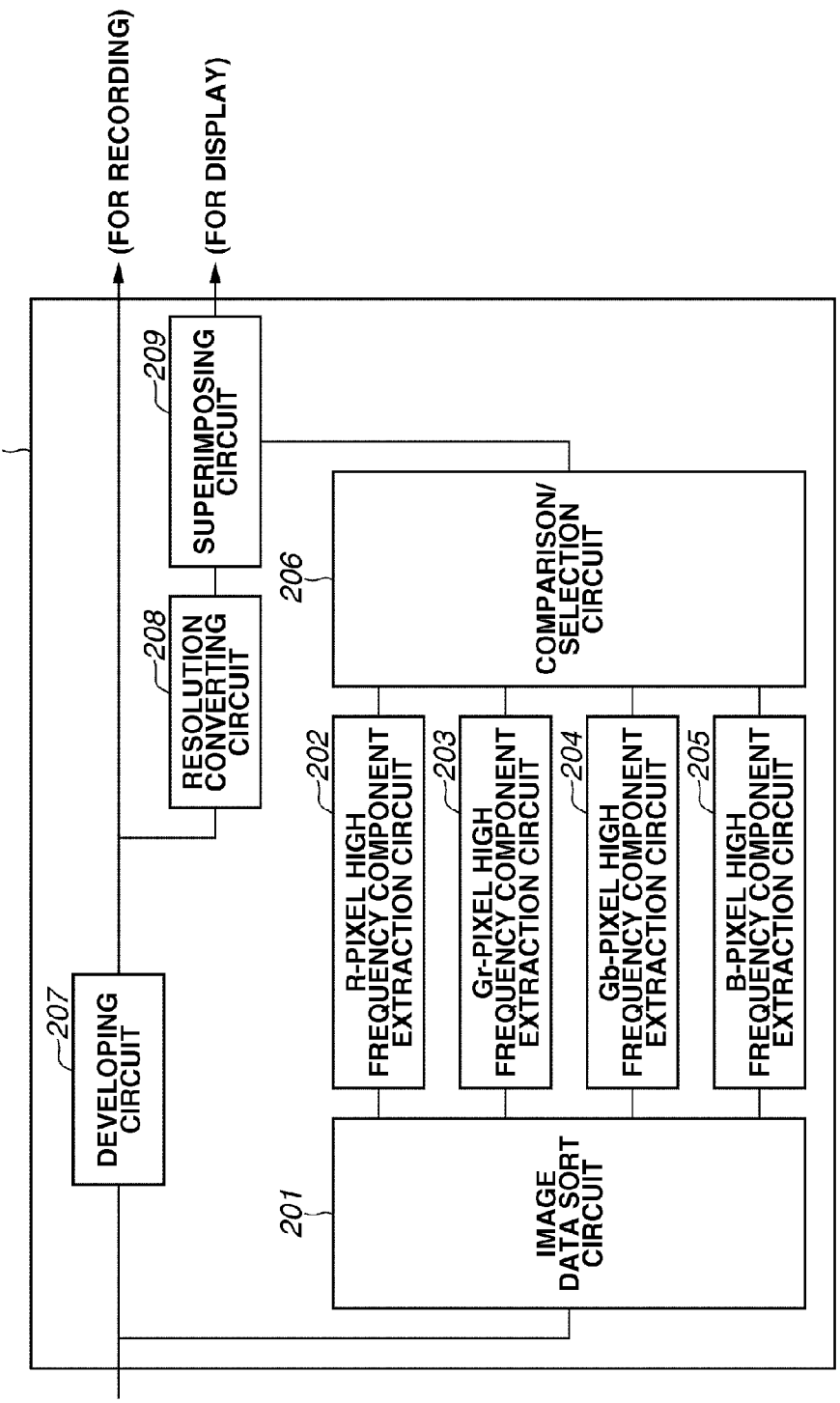
FIG. 2 is a block diagram illustrating a configuration for peaking processing according to the first exemplary embodiment.

FIG. 2 is a block diagram illustrating a configuration for the peaking processing, which is included within the camera signal processing unit 106 together with other functions. FIGS. 3A to 3E are image diagrams in performing the peaking processing according to the first exemplary embodiment.

Figure 3A:
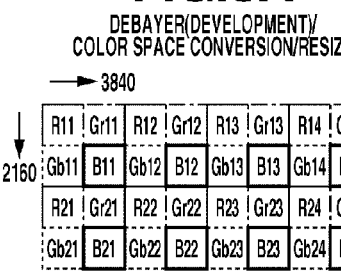
FIGS. 3A-3E illustrate image diagrams in the peaking processing according to the first exemplary embodiment.
Figure 3B:
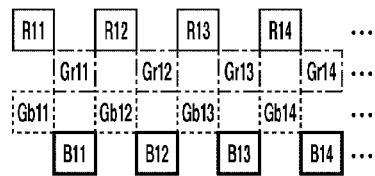

The A/D converter 105 converts pixel data arrayed according to elements of an image sensor 102 into a digital signal. An image data sorting circuit 201 sorts the converted pixel data into each color and distributes the sorted data to high frequency components extraction circuits 202 to 205 in the next stage. In the image sensor employed here, R, Gr, Gb and B are arranged on CMOS sensors repeating four pixels in a Bayer array in a c shape as shown in FIG. 3A. A number of pixels is 3,840×2,160. The image data sorting circuit 201 sorts out each color pixel data arranged in the Bayer array and distributes the sorted data to high frequency components extraction circuits 202 to 205 as shown in FIG. 3B. The pixel array of the image sensor according to the present embodiment is not limited to the Bayer array. For example, the present embodiment can be applied to various types of generally used array methods of a color filter array for single panel, such as primary color array like interline array, slanted stripe array, and G-stripe RB-checkered array, or complementary color array methods like field color difference sequential array, frame color difference sequential array, frame interleave array, and field interleave array. Further, the present invention can be applied to a uniquely constructed pixel array other than the above as long as it is a pixel array with regularity.

An R high frequency components extraction circuit 202 extracts high frequency components (edge information) from among the R pixel data sorted by the image data sorting circuit 201 via a general high pass filter (HPF) or band pass filter (BPF). Other high frequency components extraction circuits 203 to 205 perform the same process except that a pixel color to be processed is different from a color to be processed by the R high frequency components extraction circuit 202. These high frequency components extraction circuits 202 to 205 function as an extraction means in combination.

A comparison/selection circuit 206 functions as a peaking information generating means. Each color pixel is subjected to the filtering process by high frequency components extraction circuits 202 to 205. The comparison/selection circuit 206 compares amplitude of high frequency components of the filtered color pixels in a Bayer unit to select a component of the largest amplitude and output it as peaking information. In an example illustrated in FIG. 3C, among high frequency components of R11', Gr11', Gb11', and B11', amplitude of the component Gb11' is the largest. Since one piece of the peaking information is selected from the high frequency components of four Bayer pixels as a result of the comparison, resolution of the edge information is a half horizontal and vertical size, namely, 1,920×1,080.

The A/D converter 105 converts the pixel data arrayed according to elements of the image sensor 102 into a digital signal. A development circuit 207 debayers the converted pixel data and performs development processing on the pixel data to be RGB444. The processed pixel data may be transferred as it is to a succeeding stage. However, for sake of simplicity, color space conversion is carried out to change RGB444 to YCC444 in the present case.

Figure 3D:
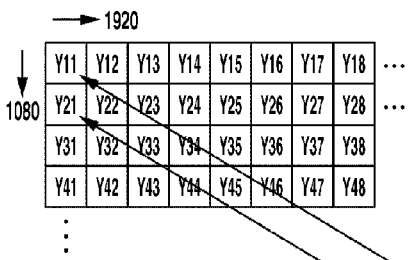
Figure 3C:
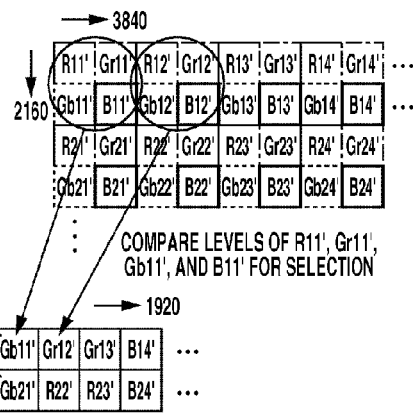

A resolution converting circuit 208 functions as a resolution conversion means. The resolution converting circuit 208 performs the resolution conversion by general filter processing (e.g., BiCUBIC) to display the YCC444 developed by the development circuit 207 on display units 122 and 123 which are connected to the video control unit 115 in the succeeding stage, or to output the YCC444 from a video image output terminal. In the present case, the resolution is reduced from 3,840×2,160 to 1,920×1,080. Luminance Y subjected to the reduction processing is illustrated in FIG. 3D.

Figure 3E:
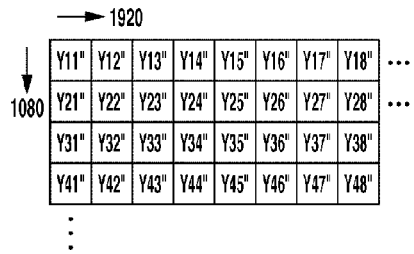

A superimposing circuit 209 functions as a superimposing or substituting means. The superimposing circuit 209 superimposes one piece of the peaking information (1,920×1,080) selected by the comparison/selection circuit 206 from the high frequency components of four Bayer pixels, on a luminance signal Y of the display signal (1,920×1,080) which is resized by the resolution converting circuit 208. The processed image is illustrated in FIG. 3E. In the superimposing processing, the signal may be mixed at an arbitrary ratio or substituted with peaking information exceeding a separately provided arbitrary threshold.

As described above, when one piece of the peaking information is extracted from the high frequency components of each color pixel data, the edge information of the high frequency components can be extracted as the peaking information. Therefore, even when the peaking processing is performed on the display data showing display resolution lower than the image sensor, the edge information of a multi-pixel video image is not lost and a focus assist function for achieving a precise focus can be realized. As a result, visibility in a manual autofocus assist operation achieved through the peaking processing can be improved at the time of high resolution shooting.

According to the first exemplary embodiment, the amplitude of high frequency components of four Bayer pixels is compared. However, out of four Bayer pixels, only amplitude of two pixels (Gr and Gb) may be compared. A basic thought is similar to the first exemplary embodiment and therefore is not particularly illustrated. Merely the processing of Green which covers about 58.7% calculated in terms of the luminance, can be sufficient in the peaking processing for the focus assist in some system. Such processing has its place as a shrunk version instead of all color comparison from a standpoint of hardware resource of an installed system or power consumption. As its effect, similar to the first exemplary embodiment, visibility in a manual autofocus assist operation achieved through the peaking processing can be improved at the time of high resolution shooting.

The second exemplary embodiment according to the present invention will be described. A digital cine-camera provided with a peaking function according to the second exemplary embodiment has a configuration similar to the first exemplary embodiment and therefore its description is not repeated.

With reference to FIG. 4 and FIG. 5, the peaking processing will be described, which serves as a focus assist function in a manual focus operation of a digital cine-camera according to the present exemplary embodiments. FIG. 4 is a block diagram illustrating a configuration for the peaking processing and is included within a camera signal processing unit 106 together with other functions.

An image data sorting circuit 201, high frequency components extraction circuits 202 to 205, a development circuit 207, a resolution conversion circuit 208, and a superimposing circuit 209 is similar to those described in the first exemplary embodiment. FIGS. 5A to 5E are image diagrams when the peaking processing is performed according to the second exemplary embodiment and corresponds to FIGS. 3A to 3E in the first exemplary embodiment.

An arithmetic circuit 210 functions as a peaking information generating means. The arithmetic circuit 210 calculates in a Bayer unit the high frequency components on which the high frequency components extraction circuits 202 to 205 has performed filtering for each color pixel.

When it is assumed that a luminance equation Y=eG+fB+gR (e, f, and g are coefficients), the NTSC luminance equation Y=0.587G+0.114B+0.299R, for example. When R:Gr:Gb:B is 3:3:3:1, as an approximate expression, $$Y11'=(3 \cdot Gr11'+3 \cdot Gb11'+B11'+3 \cdot R11') \cdot \alpha \quad (1)$$

where α is an arbitrary constant number. The addition is performed to output its result as the peaking information. Since one piece of the peaking information is selected from among the high frequency components of four Bayer pixels, resolution of the edge information is a half, namely 1,920×1,080 in a horizontal and vertical size respectively.

As described above, when one piece of the peaking information is selected from among the high frequency components of each color pixel, the edge information which is the high frequency component can be extracted. Accordingly, even when the peaking processing is performed on display data with display resolution lower than the image sensor, the edge information of the multi-pixel video image is not lost and the focus assist function for precise focusing can be realized. As a result, visibility in a manual focus assist function achieved by the peaking processing can be improved at the time of high resolution shooting.

According to the second exemplary embodiment, the high frequency components of four Bayer pixels are added at a predetermined ratio. However, instead, high frequency components of two pixels (Gr and Gb) may be added. More specifically, $$Y11'=(Gr11'+Gb11') \cdot \alpha \quad (2)$$

where α is an arbitrary constant number. A result of the addition is output as the peaking information. A basic thought is similar to the first exemplary embodiment and is not particularly illustrated. However, merely the processing of Green which covers about 58.7% calculated in terms of the luminance, can be sufficient in the peaking processing for the focus assist in some system. Such processing has its place as a shrunk version instead of all color comparison from a standpoint of hardware resource of an installed system or power consumption. As its effect, similar to the second exemplary embodiment, visibility in a manual autofocus assist operation achieved by the peaking processing can be improved at the time of high resolution shooting.

The third exemplary embodiment of the present invention will be described. A configuration of a digital cine-camera provided with the peaking function according to the third exemplary embodiment is similar to the first exemplary embodiment, therefore, it is not repeated.

With reference to FIG. 6 and FIG. 7, the peaking processing will be described, which serves as a focus assist function in a manual focus operation of the digital cine-camera according to the present exemplary embodiments. FIG. 6 is a block diagram illustrating a configuration for the peaking processing and is included within a camera signal processing unit 106 together with other functions.

An image data sorting circuit 201, high frequency components extraction circuits 202 to 205, a development circuit 207, a resolution conversion circuit 208, and a superimposing circuit 209 is similar to those described in the first exemplary embodiment. FIGS. 7A to 7D are image diagrams when the peaking processing is performed according to the third exemplary embodiment and corresponds to FIGS. 3A to 3D in the first exemplary embodiment.

An arithmetic/comparison/selection circuit 211 functions as a peaking information generating means. The arithmetic circuit 211 calculates in a Bayer unit the high frequency components on which the high frequency components extraction circuit 202 to 205 has performed the filtering processing for each color pixel, compares a calculated result and selects the largest data to output as the peaking information as illustrated in FIG. 7C.

In the case of FIG. 7C, levels of (Gr11'+Gb11') and (R11'+B11') in which directions of connecting the calculation subjects are perpendicular to each other, are compared, and A11' which has a larger level is selected. As a result of calculation and comparison, since one piece of the peaking information is selected from among the high frequency components of four Bayer pixels, resolution of the edge information is a half, namely, 1,920×1,080 in a horizontal and vertical size respectively.

As above described, when one piece of the peaking information is selected from among the high frequency components of each color pixel, the edge information which is the high frequency component can be extracted. Accordingly, even when the peaking processing is performed on display data with display resolution lower than the image sensor, the edge information of the multi-pixel video image is not lost and a focus assist function for precise focusing can be realized. As a result, visibility in a manual focus assist function achieved by the peaking processing can be improved at the time of high resolution shooting.

The exemplary embodiments of the present invention have been above described. However, they are not limited thereto and can be modified in various ways as long as they are made within the spirit and scope of the present invention. Further, a part of the above exemplary embodiments may be appropriately combined. In particular, the descriptions have been given on the basis of the Bayer array as an image sensor structure. However, the present invention is applicable where an arrangement of pixels is different, or another color combination is included and the processing is performed in a repeated manner.

Further, while in the above described exemplary embodiments, the present invention is applied to the digital cine-camera, the present invention can be applied to any image capturing apparatus provided with the peaking processing for the focus assist such as a digital video camera for professional use or a broadcast station, a digital still camera, a portable information terminal equipped with a camera and a cellular phone equipped with a camera.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-069992, filed Mar. 26, 2012, which is hereby incorporated by reference herein in its entirety.

What is claimed is:

1. An image capturing apparatus comprising:
   an image sensor configured to convert an optical image into a video signal including a plurality of pieces of color pixel data;
   a converting unit configured to convert a number of pixels of the video signal obtained by the image sensor;
   a generating unit configured to extract high frequency components of each color pixel data of a video signal obtained by the image sensor, and generate peaking information from the high frequency components;
   a processing unit configured to reflect the peaking information on the video signal of which the number of pixels has been converted into a fewer number of pixels by the converting unit than a number of pixels of the video signal of which the high frequency components are extracted; and
   a controller configured to:
      output a video signal processed by the processing unit to a display medium for displaying; and
      output a video signal to a recording medium for recording, wherein the video signal is obtained by the image sensor and the number of pixels is not converted by the converting unit in the video signal.

2. The image capturing apparatus according to claim 1, wherein the generating unit calculates the extracted high frequency components of each color pixel data for each area to generate the peaking information.

3. The image capturing apparatus according to claim 2, wherein the image sensor is arranged in a Bayer array, and
   wherein the generating unit compares amplitude of the high frequency components in a unit of the Bayer array, and outputs the component of a greatest amplitude as the peaking information.

4. The image capturing apparatus according to claim 2, wherein the generating unit compares amplitude of the high frequency components of two pixels of Gr and Gb in a unit of the Bayer array.

5. The image capturing apparatus according to claim 2, wherein the image sensor is arranged in a Bayer array, and
   wherein the generating unit outputs as the peaking information a result obtained by adding the high frequency components of four pixels at a predetermined ratio in a unit of the Bayer array.

6. The image capturing apparatus according to claim 5, wherein as the predetermined ratio, R:Gr:Gb:B is represented by 3:3:3:1.

7. The image capturing apparatus according to claim 2, wherein the image sensor is arranged in a Bayer array in which R, Gr, Gb and B are disposed, and
   wherein the generating unit makes addition of the high frequency components of two pixels of Gr and Gb in a unit of the Bayer array, and outputs an addition result of the high frequency components as the peaking information.

8. The image capturing apparatus according to claim 2, wherein the image sensor is arranged in a Bayer array in which R, Gr, Gb and B are disposed, and
   wherein the generating unit makes addition of the high frequency components of two pixels of Gr and Gb and addition of the high frequency components of two pixels of R and B among four pixels of R, Gr, Gb and B in a unit of the Bayer array, compares their amplitude and outputs the components of the greater amplitude as the peaking information.

9. The image capturing apparatus according to claim 1, wherein the processing unit reflects the peaking information on a luminance signal of the video signal of which the number of pixels has been converted by the converting unit.

10. The image capturing apparatus according to claim 1, wherein the converting unit converts the number of pixels of the video signal obtained by the image sensor so as to make the number of pixels smaller and,
    wherein the generating unit generates the peaking information of a number of pixels that is a same as the number of pixels of the video signal that has been converted by the converting unit.

11. The image capturing apparatus according to claim 1, wherein the generating unit compares the extracted high frequency components of each color pixel data for each area, and generates the peaking information for each area.

12. The image capturing apparatus according to claim 11, wherein the generating unit compares amplitude of the extracted high frequency components of each color pixel data for each area, and outputs a high frequency component of a greatest amplitude as the peaking information for each area.

13. The image capturing apparatus according to claim 3, wherein the generating unit compares amplitude of the high frequency components of four pixels of R, Gr, Gb and B in a unit of the Bayer array.

14. The image capturing apparatus according to claim 1, further comprising:
    a display unit configured to display on the display medium the video signal processed by the processing unit; and
    a recording unit configured to record on the recording medium the video signal obtained by the image sensor.

15. A control method of an image capturing apparatus provided with an image sensor configured to convert an optical image of a shooting subject formed via an optical system into a video signal including a plurality of pieces of color pixel data, the method comprising:

converting a number of pixels of the video signal obtained by the image sensor;

extracting high frequency components of each color pixel data of the video signal obtained by the image sensor, and generating peaking information from the high frequency components;

reflecting the peaking information on the video signal of which the number of pixels has been converted into a fewer number of pixels than a number of pixels of the video signal of which the high frequency components are extracted;

outputting the processed signal to a display medium for displaying; and outputting a video signal to a recording medium for recording, wherein the video signal is obtained by the image sensor and the number of pixels is not converted in the video signal.

16. A storage medium storing a program for controlling an image capturing apparatus provided with an image sensor configured to convert an optical image of a shooting subject formed via an optical system into a video signal including a plurality of pieces of color pixel data, the program causing the computer to execute:

converting a number of pixels of the video signal obtained by the image sensor;

extracting high frequency components of each color pixel data of the video signal obtained by the image sensor, and generating peaking information from the high frequency components;

reflecting the peaking information on the video signal of which the number of pixels has been converted into fewer number of pixels by the converting unit than a number of pixels of the video signal of which the high frequency components are extracted;

outputting the processed signal to a display medium for displaying; and outputting a video signal to a recording medium for recording, wherein the video signal is obtained by the image sensor and the number of pixels is not converted in the video signal.

17. An image capturing apparatus comprising:

an image sensor configured to convert an optical image into a video signal including a plurality of pieces of color pixel data;

a generating unit configured to extract high frequency components of each color pixel data of the video signal obtained by the image sensor, and generate peaking information from the high frequency components;

a developing unit configured to develop the video signal obtained by the image sensor;

a processing unit configured to reflect the peaking information on the video signal developed by the developing unit; and a controller configured to:

output a video signal processed by the processing unit to a display medium for displaying; and output a video signal to a recording medium for recording, wherein the video signal is obtained by the image sensor and not developed by the developing unit.

18. The apparatus according to claim 17, wherein the development by the developing unit includes conversion of a color space of the video signal.

* * * * *